United States Patent Office 3,355,314
Patented Nov. 28, 1967

3,355,314
COATING METHOD FOR GLASS FABRIC
AND PRODUCT THEREOF
Roland K. Gagnon, Kraainem, Brussels, Belgium, and Frank J. Lachut, Pawtucket, R.I., assignors to Owens-Corning Fiberglas Corporation, Toledo, Ohio, a corporation of Delaware
No Drawing. Filed May 21, 1964, Ser. No. 369,296
9 Claims. (Cl. 117—72)

ABSTRACT OF THE DISCLOSURE

A method for treating woven glass fabric to improve abrasion resistance by (1) applying a composition composed of polyvinyl alcohol, an alkylated urea or melamine aldehyde resin, an organic amine hydrochloride, colloidal silica and water, (2) applying a dilute solution of a Werner-type complex compound containing an acido group of at least 10 carbon atoms and (3) drying same to yield the coated fabric.

This application is a continuation-in-part application based on our prior copending application Ser. No. 77,290, filed on Dec. 21, 1960, which application is now abandoned.

The present invention relates generally to a coating method and composition for glass fibers, and more particularly to a coating method and composition for textile materials and the like fabricated from glass fibers, and which are effective to promote and enhance the characteristics of such fibers and materials.

Heretofore, in order to impart improved properties and characteristics to various types of glass fiber fabrics, textiles and materials, it has been found to be highly desirable in many instances to substantially modify them so as to render them more compatible with the various conditions and uses to which they may be ultimately exposed or subjected. In this respect, it has been common practice to coat such glass fibers, fabrics and materials with a suitable coating composition capable of imparting as many of the improved properties and characteristics as can be obtained without detrimental effect upon other desirable natural properties and characteristics of the fibers. Such coating compositions are generally referred to as "finishing" compositions; and as a result of continued experimentation and development, such finishing compositions have been improved to such an extent as to provide in one coating composition numerous and diversified characteristics and properties which are impartable to the fibers on which they are applied. However, as the fields and conditions of use of such fibers, fabrics and materials constantly expand, there arises the need of new and improved coating compositions capable of imparting still further and better properties and characteristics to the fibers, etc.

For example, glass fibers, which constitute a relatively new fabricating material, are continually finding new application in many fields of use such as in textile, electrical and thermal insulation, structural reinforcing, screening, etc. Also, glass fiber products which have been commonly used heretofore are continually being improved and the resultant demand for glass fibers having new and improved properties is continually increasing.

As a consequence of the many desirable properties inherent in glass fibers, particularly with respect to such properties as chemical inertness, moisture resistance, high strength, dimensional stability, nonflammability and resistance to rot, mildew and decomposition, among others, glass fiber yarns and fabrics have enjoyed a wide public acceptance and are in great demand as substitute fibers to be used in place of cotton, wool, rayon, silk and other animal, mineral and vegetable fibers. However, it has been found that even a very slight scratch on the surface of a glass fiber results in an inherent weakening of its strength. In fact, it has been found that even the slightest scratch or abrasion on the surface of an individual glass filament may reduce the potential strength of the filament by better than 60–75%. Thus, in the fabrication of textile materials from glass fibers a serious problem of abrasion exists due to the interlacing and tight woven character of the fibers. In use, mere handling of a glass fiber fabric naturally causes frictional fiber movement and possible damaging abrasion of the fabric fibers. Also, quite unlike the fibers of cotton, wool, rayon, silk and the like which exhibit a relatively uneven surface configuration and possess hair-like ends which protrude from the body of such fibers, glass fiber filaments exhibit an extremely smooth and even surface finish substantially free from such hair-like ends protruding from the body thereof. Accordingly, it is extremely difficult to obtain sufficient surface cleavage between glass fibers and dyes, inks and other various types of surface coatings which it is frequently desirable to apply onto the surface of glass fibers and yarns, etc., for decorative purposes and the like. Such surface cleavage is rendered even more difficult with respect to glass fibers due to the non-absorbent character of glass as compared with filaments of other types of fibers, such as those previously mentioned. Thus, not only are glass filaments, fibers, yarns and fabrics extremely unreceptive to receiving printing, coloring and the like, such coatings as are applied to the surface of the glass are ordinarily subject to relatively easy removal. Consequently, the permanency of such coatings is ordinarily destroyed or impaired by handling, laundering and aging attendant with use. It, therefore, has been found to be extremely desirable to coat glass filaments, fibers, yarns and fabrics with surface coatings which are capable of bonding or anchoring to the glass with great tenacity to thereby form an intermediate surface coating which is much more highly receptive to the application of dyes, inks and other various surfacing agents and materials and which may be utilized to enhance the decorative and physical characteristics of the glass filaments, as well as the various related and fabricated forms thereof. For example, in the fabrication of draperies, casement cloths and marquisette curtains and the like from glass fibers, it has been found to be extremely desirable to enhance the physical characteristics of the glass fibers, particularly with reference to imparting to the fibers an improved abrasion resistance, dyeability, printability, hand or feel, shrink and stretch resistance, shape retention, sewability, and launderability, among other various properties.

Accordingly, it is a principal object of the present invention to provide a coating method and composition for glass filaments, fibers, yarn and fabrics, etc., which is effective to promote enhanced characteristics thereto.

Another object of the present invention is to provide a coating method and composition for glass fibers to more effectively protect the fibers against mutual abrasion and consequent reduction of strength.

A further object of the present invention is to provide a coating method and composition for glass fibers which will render the fibers more receptive and permanently retentive to applied colors, dyes, inks and other various coloring, coating and treating mediums.

A further object of the present invention is to provide a coating method and composition for glass fibers, filaments and the like, which is capable of imparting to the fibers, filaments and the like increased abrasion resistance, a high degree of shrinkage and stretch resistance, dimensional stability, launderability, sewability and resistance to soilage, heat and rot or mildew.

A still further object of the present invention is to provide a coating method and composition for glass fibers and fabrics which imparts upon the surface of the fibers or fabrics a continuous finish which tenaciously anchors or bonds to the surface of the glass fibers or fabrics and which is highly resistant to removal therefrom either by abrasion, by exposure to high humidity conditions, or by laundering.

The foregoing, as well as other objects and advantages of the present invention, will become readily apparent to those skilled in the art from the following detailed description and specific examples which are merely explanatory and are only intended to impart greater clarity as to the nature of the invention, and not to limit the scope thereof.

The present invention will be hereinafter described with principal reference to a coating method and composition for treating fabrics composed of interwoven glass fibers. It is to be understood, however, that the invention in its broad aspect is not intended to be limited to use in conjunction with fabrics, since it will be readily apparent that it is likewise applicable for use in conjunction with filaments, strands and fibers of glass, to impart improved properties and characteristics to such filaments, strands and fibers. Also, it is understood that the coating method and composition of this invention can be advantageously utilized to improve the properties of other various glass fiber products such as, among others, reinforcing fibers, insulating materials, screening materials, roving tapes, braided sleeving and tubing, yarns, etc.

In the formation of glass filaments which ultimately are combined into strands, yarns, fibers, etc., it is ordinarily preferable and common prior art practice to utilize size compositions composed of starch, gelatin or organic materials for the purpose of coating such filaments. Ordinarily, the sizes are primarily applied to protect and isolate the surfaces of the glass filaments from exposure to moisture and attack by acid or alkaline solutions and certain undesirable ambient atmospheric conditions, particularly during the interval of time while the glass surface cannot otherwise be suitably protected by controlled ambient, conditions. Also, a substantial degree of lubricity is usually imparted by the sizes to the filament surfaces to protect against abrasion. In some instances such sizes are applied and are permitted to permanently remain on the glass surface to act as an intermediary and coupling agent for adhering various resinous materials to the filament during subsequent processing operations, particularly in such instances as when the fibers are intended to be utilized in the formation of matting or other materials utilizing relatively short chopped filamentary glass fibers. According to the preferred embodiment to be herein described, however, it is preferred that such sizing be removed prior to the utilization of the coating composition and method of the present invention. Although the removal of such sizes and coatings is not intended to form a part of this invention, and although different sizes may require some variations in the method of removal, it has been found that most sizes such as sucrose, or other starchy, oleaginous or gelatinous materials ordinarily may be effectively removed with a water wash or by subjecting the size to a heat treatment of sufficient temperature intensity that the coating or size will be oxidized and thereby burned from the surface of the glass. In this regard, the high temperature oxidation manner of removal of the size is ordinarily preferable because in addition to accomplishing the removal of the size, the high temperature may be employed also to effect a relaxation of the glass filaments or fibers in order to alleviate them of stress, strain or crimp arising during prior processing. Temperatures in the range of 1200° F. to 1400° F., dependent upon the particular size being removed, maintained from several seconds to about 30 minutes are ordinarily sufficiently effective to remove the size from the glass surface. Further, it has been found that such a heat treatment can be utilized quite effectively when applied to woven fabrics, to set the weave in the fabric. U.S. Patent No. 2,845,364 issued to J. H. Waggoner, for example, particularly discloses a suitable method and apparatus for effecting a concurrent size removal and weave setting of a woven glass fiber fabric.

In the present invention it has been found that by combining a size removal and weave setting process, such as that set forth in the aforementioned Waggoner patent with the coating composition and method of the present invention, a fabric possessing excellent abrasion resistance and superior characteristics of hand, drape, wrinkle and crease resistance and dimensional stability may be obtained. In accordance with the present invention, a glass fiber fabric having the size, coating or other foreign material removed from the fibers, in order to expose the glass surface, is coated with a basic coating composition comprising an aqueous dispersion of polyvinyl alcohol, an acid curing aminoplast resin, the latter preferably being an alkylated methylol urea or melamine aldehyde resin, and colloidal silica diluted and dispersed in a suitable carrier, such as water, for economy and ease of application. As is well known in the art, the polyvinyl alcohol and the acid curing aminoplast resinous components are water soluble and therefore go into solution with the water carrier, whereas the colloidal silica will remain within the solution as a suspension. Following coating with the foregoing composition, the fabric is thoroughly dried and thereafter preferably overcoated with a Werner-type complex compound, the latter acting to fix or set the resinous component of the initial coating and to simultaneously impart a water repellency to the coating.

The polyvinyl alcohol component is preferably derived from polyvinyl acetate by a hydrolysis process and is commercially available in a wide variety of grades according to various degrees of hydrolysis and viscosity. For example, several commercially available grades of polyvinyl alcohol found to be suitable in the present invention are under the trade name "Elvanol" by the E. I. du Pont de Nemours & Company, Wilmington, Del. These include polyvinyl alcohols representing 88%, 98% and 99% hydrolysis of the polyvinyl acetate. The more preferable grades of polyvinyl alcohol, however, are those which fall within the range of about 98–100% hydrolysis of the polyvinyl acetate. The preference expressed, however, is not intended to be a limitation upon the scope of the present invention, but merely a preference by virtue of the fact that it has been observed that the increased degree of hydrolysis is accompanied by an increased water solubility which facilitates application of the resultant finish coating composition. It is also preferred to utilize a polyvinyl alcohol possessing a medium to relatively high viscosity and molecular weight, the viscosity of the polyvinyl alcohol being a measure of the molecular weight of the polyvinyl acetate from which it was derived. In this respect a viscosity ranging between about 15–70 centipoises, as determined by the Hoeppler falling ball testing method is preferred, and, as used herein, is intended to correspond to a medium to relatively high viscosity polyvinyl alcohol, whereas a viscosity of about 70 centipoises, as determined by the same testing method, corresponds to a high viscosity polyvinyl alcohol. One salient feature is that the attainment of the highly improved results attendant with the use of the coating composition of this invention does not require the utilization of large quantities of polyvinyl alcohol. In fact, extremely effective results have been achieved with polyvinyl alcohol percentages ranging from about 1.0% to 4.0% by weight of the coating composition.

The acid curing thermosetting resin component of this invention is preferably an irreversibly polymerizable heat-setting resin which undergoes a continuous polymerization reaction attendant with curing when heated in the presence of an acid promoter. Illustrative examples of such acid curing thermosetting resins are the urea and melamine aldehyde resins which, when so heated, attain a final and irreversible state of polymerization and are incapable of being returned to a softened, remoldable state, as in the case of most thermoplastic resins, such as the vinyls and styrenes, etc.

The preferred aminoplast resin component of this invention is an alkylated melamine formaldehyde resin, such as may be prepared by heating a monomeric melamine formaldehyde condensation product together with a primary alcohol in the presence of an acid condensing agent. Alkylated melamine formaldehyde resins prepared from the primary or lower aliphatic alcohols, such as methanol, ethanol or butanol, and particularly the methylated methylol melamines, have been found to be preferable. In this regard, the facile dispersibility of these aminoplast resins in water, alcohol and alcohol-water mixtures is particularly desirable. Furthermore, glass fibers when treated with the resultant treating composition in accordance with the principles of this invention are found to possess an extremely high degree of water repellancy, and, although the particular and complex nature of the factors giving rise to this water repellancy are not with certainty fully known, experimentation indicates that the improved water repellancy results primarily from the presence of the aminoplast resin constituent. In this respect the aminoplast resins of the type described are extremely compatible with the other components of the treating composition of this invention and may be mixed uniformly in the coating composition. Also, subsequent evaporation of the solvent and exposure of the resulting coating composition to high temperatures effects a curing of the aminoplast resin. Although it is possible to cure these aminoplast resins simply by long heating at relatively high temperatures, a more rapid and effective curing can be accomplished by also admixing into the coating composition an acid type catalyst or accelerator, and such accelerators are preferably employed in the practice of the present invention. Methylated methylol melamine formaldehyde is a preferred type of aminoplast resin and can be prepared by heating 126 parts by weight of melamine and 486 parts of 37% aqueous formaldehyde solution at 60-70 degrees C. to dissolve the melamine, adding NaOH solution to raise the pH to 7.5, concentrating under a partial vacuum to 75% solids, adding 864 parts of methanol containing sufficient phosphoric acid to neutralize the NaOH, and distilling off methanol and water to obtain a resin solution containing 62% methylated methylol melamine, and 38% methanol. The methylated methylol melamine formaldehyde resin for best results comprises from about 2.5% to about 24.0% of the total weight of the coating composition. For optimum toughness and abrasion resistance, however, it has been found to be preferable to maintain the methylated methylol melamine formaldehyde resin content in the range of about 12% by weight of the coating composition. American Cyanamid markets an alkylated melamine formaldehyde resin under the trade name Permel Resin B, which is useful in the practice of the present invention.

In a preferred embodiment of the present invention, the aminoplast resin is utilized in modified form by the admixture with the methylated methylol melamine formaldehyde resin of a guanidine resin, preferably an acyl guanidine, such as may be prepared by the reaction of guanidine with an ester of a higher fatty acid containing 7 to 18 carbon atoms. In such instances the acyl guanidine is preferably used in admixture with the methylated methylol melamine formaldehyde in an amount sufficient to constitute about 5 to 20%, by weight, of the aminoplast constituent. Specific examples of some suitable fatty acid esters for reaction with guanidine in forming an acyl guanidine are the methyl or ethyl esters of caproic acid, caprylic acid, lauric acid, myristic acid, palmitic acid or stearic acid.

In addition to maintaining the components of the coating composition within the proper ranges as set forth hereinabove, it is also most preferable to control the relative amounts of the polyvinyl alcohol and aminoplast resin constituents in order to achieve certain desirable optimum properties. It has been found particularly with respect to improved abrasion resistance that the weight ratio of aminoplast resin to polyvinyl alcohol preferably should fall between 3.5:1.0 to 8.0:1.0. Even more preferably, the ratio should be between 4.0:1.0 to 7.0:1.0. The results summarized in Tables I-A I-B appearing hereinafter illustrate the preferred ranges.

The catalyst for the aminoplast resin may be selected from a wide variety of acid type catalysts commonly used in accelerating polymerization of the resins. Organic amines hydrochlorides including amino substituted alkyl hydrochlorides and alcohol hydrochlorides having 10 carbon atoms or less perform very satisfactory. Examples include ethyl amine hydrochloride, propyl amine hydrochloride, butyl amine hydrochloride, ethyl hexyl amine hydrochloride as well as the corresponding hydroxyl bearing alcohols, e.g., 2 amino-2 methyl-1-propanol hydrochloride, 2-amino-2 methyl-1-pentanol hydrochloride, etc.

The non-resinous constituent present in the coating composition of the present invention is preferably a form of colloidal silica. One commercially available form of colloidal silica is marketed by the Monsanto Chemical Co., of St. Louis, Mo., under the trade name "Syton DS," which is a water-silica dispersion composed of 15% by weight of colloidal silica. Although the precise nature in which the colloidal silica contributes to the achievement of the improved properties of the composition of the present invention is not capable of positive explanation, it is theorized that the colloidal size and form of the silica constituent tends to enhance the distribution of the silica and the other constituents of the coating composition uniformly over the glass fiber surfaces. After drying, the colloidal silica is firmly bonded on the fibers by the resinous components of the treating composition. So distributed and bonded onto the fibers, it is theorized that the colloidal silica substantially enhances the slippage resistance between the interwoven fiber surfaces. Also, an improved fiber orientation is thereby maintained. Moreover, the relatively fluid and watery character of the overall coating composition enables it to fully penetrate into the interstices between fibers and enter the weave pattern of even very tightly woven fibrous fabrics.

According to a further embodiment of the present invention, there is utilized as a resinous component of the coating composition, a small amount of an acrylic resin, preferably containing functional carboxylic groups. Usually about 1%, by weight, of the acrylic resin based upon the weight of the coating composition is sufficient to produce the desired result. However, in particular instances up to about 15% to 20%, by weight, of the acrylic resin may satisfactorily be employed. Desirable results, dependent upon the properties desired, can also be obtained by direct substitution of the acrylic resin for a portion of the aminoplast resin. An acrylic resin containing functional carboxylic groups and of the type found to be suitable for use in the practice of the present invention is marketed by the B. F. Goodrich Co. under the code designation and trade name "Hycar 2600-X30."

Quite obviously and without departing from the concepts of this invention, the treating composition of this invention can, by suitable and conventional applicating apparatus, be applied directly to strands, filaments, fibers, and yarns as well as by application of the treating composition to a fabric or material formed from such strands, fibers, etc. For example, the treating composition can be readily applied directly to strands, filaments, fibers, etc., by the methods and apparatuses described in detail in the Norton et al. U.S. Patent No. 2,867,891 and the Miller et al. U.S. Patent No. 2,910,383, both assigned to the assignee of the present invention and both relating to methods and apparatuses for the application of resinous coating materials to glass fibers, strands, filaments, etc. For purposes of economy and simplicity of operating procedure, it has ordinarily been preferable practice, however, where the fibers, etc., are to be integrated or incorporated into a fabric, to apply the coating or finish composition directly onto the formed fabric. Consistent with such preferable practice, the coating composition and method of the present invention is preferably employed in conjunction with a continuously moving length of formed fabric after the sizing composition, if any, has been removed, and after the fabric has been subjected to a weave setting process. Generally, the removal of the sizing composition is carried out for purposes of convenience and ecnomy concurrently with the weave setting processes by subjecting the fabric to a heat treatment at temperatures of about 900° F. to 1250° F. or higher, in an oxidizing atmosphere for closely controlled periods of time. The length of time the fabric is heated in this manner is, of course, dependent in large measure upon the particular nature of the fabric, the weight and type of weave of the fabric, and the particular temperatures to which the fabric is exposed. Exposure of the fabric to temperatures in the range specified for periods of up to about 30 minutes is ordinarily sufficient to oxidize and burn off the sizing composition and at the same time relax the fibers sufficiently to remove residual stresses and strains therefrom and permit the fibers to properly orient and conform naturally to the intended weave pattern of the fabric.

As explained, the coating composition is most conveniently applied as a combination solution and dispersion; although the coating composition may be readily applied to the fabric when the latter emerges from the weave setting and size removal process by a dip, flow coat, roller coat, padder or spray process. In the preferable manner of application, a continuously moving stretch or web of the fabric following emergence from the weave setting and size removal process is trained over a series of offset rollers which direct the fabric beneath the liquid level of a bath of the coating composition which is contained in a suitable reservoir or tank, and thence out of the coating composition to adjustable squeeze rollers. The squeeze rollers are tangentially disposed and rotate in counter directions to direct and guide the coated fabric forward from the coating composition between the peripheral surfaces of the rollers where the fabric is squeezed by the pressure of the rollers to remove all but a desired amount of the coating composition from the fabric. Variations in the amount of the coating applied to the fabric may be accomplished by suitable pressure adjustment of the squeeze rollers. Thereafter, the fabric is directed through a curing zone or oven where the fabric is again heated to a temperature sufficient to cure and bond the resinous components of the coating composition to the fiber surfaces and evaporate the volatile diluents therefrom. Exposure of the coated fabric to a temperature in the range of from about 200° F. to 400° F. for a period of 1 to 10 minutes is ordinarily satisfactory for the accomplishment of the desired curing and evaporation with a medium weight fabric. Of course, variations in the curing temperature may be preferable in certain instances, dependent upon the extent of the coating composition remaining on the fabric upon emergence from the squeeze rollers and the length of time during which the fabric is permitted to be exposed to such curing temperatures.

Although a single application of the coating composition may be sufficient in certain instances, it is frequently desirable to apply an additional application thereof onto the fabric. In such instances, the fabric with the dried and cured first coating is overcoated with additional coating composition, in the same manner as previously described with respect to the initial coating. Also, it is frequently desirable to introduce into the second coating a combination water-repellant and sizing agent which is preferably a water-soluble Werner-type complex chromic chloride compound, such as a sterato chromic chloride or other trivalent nuclear chromium complex coordinated with carboxylic acid groups having at least 10 and preferably 12 to 18 carbon atoms, such as the acid groups of palmitic acid, oleic acid or other similar fatty acids. Particular examples of such Werner-type complex compounds are described in the Iler U.S. Patents Nos. 2,273,040 and 2,356,161. Satisfactory water-repellance and fixation can be accomplished with a very dilute solution of the Werner-type complex compounds. For example, a slightly warm solution of 1.0% to 2.0% concentration ordinarily suffices. Following the second application of the coating composition, the fabric is again directed through a curing zone in the same manner as previously described with respect to the first coating. Following the second curing, the resultant coated fabric has been found to possess an extremely high degree of abrasion resistance and to exhibit an extremely dry and crisp hand, or feel, together with other improved finish qualities and characteristics. For example, additional fine qualities and characteristics of foldability, wrinkle resistance, water-repellancy, color-fastness and dimensional stability are imparted to the finished, resultant fabric.

For purposes of illustration, and not by way of limitation, specific examples of particular glass fiber treating compositions prepared in accordance with the foregoing description of the present invention are set forth hereinafter in Tables I–A and I–B together with test data indicative of the improved physical properties and characteristics thereof.

The series of coating compositions set out in Tables I–A and I–B and indicated as Runs 1–10 were prepared in accordance with the following description, e.g., by thoroughly mixing together with the stated quantities of water at room temperature the polyvinyl alcohol, the alkylated methylol melamine formaldehyde resin, the colloidal silica (15% solids in water dispersion) and the organic amine hydrochloride (2.5% by weight of the methylated melamine methylol formaldehyde resin). To each of these basic compositions there was also introduced 0.2%, by weight, titanium dioxide, 0.066%, by weight, Bleachers Tint and 0.0064%, by weight, Blancophor (Whitening Agent).

The series of coating compositions mentioned below were applied to glass fiber fabrics which previously had been subjected to a weave setting process and had the size burned therefrom in the preferred manner previously explained. The application of the coating compositions was accomplished by drawing the fabric through a bath of the coating composition and thereafter through a pair of squeeze rollers, also in the preferential manner previously described. The fabric with the coating composition thereon was then cured at about 250° F. Thereafter, a second layer of the coating composition was applied in the same manner as the first and thereafter cured at about 300° F.

Additionally, after curing, each of the fabrics coated with the compositions of Tables I–A and I–B was physically tested to determine its properties and characteristics. The results of these tests are also set forth in Tables I–A and I–B below and are indicative of the properties and characteristics obtainable with the improved coating method and composition of the present invention. For comparative purposes, two standard coating compositions commonly employed as commercial glass fiber fabric finish compositions were subjected to identical testing procedures. The physical properties and characteristics of these standard commercial finishes are also set forth in Tables I–A and I–B below, under the designations Control-X and Control-Y, respectively.

From the following detailed description and examples, it will be readily apparent that the coating composition and method of the present invention impart greatly improved properties and characteristics to glass fiber fabrics.

TABLE I-A

| | Controls | | Runs | | | | | |
|---|---|---|---|---|---|---|---|---|
| | X | Y | 1 | 2 | 3 | 4 | 5 | 6 |
| Composition: | | | | | | | | |
| Polyvinyl Alcohol (Elvanol 71-30) | | | 3.0 | 2.0 | 4.0 | 3.0 | 2.5 | 1.5 |
| Methylated Melamine Aldehyde Resin | | | 9.0 | 6.0 | 12.0 | 12.5 | 12.5 | 9.0 |
| Organic Amine Hydrochloride Catalyst [1] | | | 0.18 | 0.12 | 0.30 | 0.31 | 0.31 | 0.18 |
| Colloidal Silica, 15% Solids Aqueous Dispersion (SYTON DS) | | | 2.5 | 2.5 | 2.5 | 2.5 | 2.5 | 2.5 |
| Water | | | 85.3 | 89.4 | 81.2 | 81.7 | 82.2 | 86.8 |
| Weight ratio of Methylated Melamine Aldehyde Resin to Polyvinyl Alcohol | | | 3.0 | 3.0 | 3.0 | 4.2 | 5.0 | 6.0 |
| Physical Properties: | | | | | | | | |
| Abrasion Resistance, Hours | 4.5 | 8.5 | 9.0 | 12.5 | 4.0 | 23.0 | 20.0 | 9.0 |
| Static Fold and Strength Retention: | | | | | | | | |
| Warp | | 86 | 67 | 84 | | 58 | 66 | 74 |
| Filling | | 84 | 63 | 44 | | 48 | 51 | 59 |
| Tensile Strength: | | | | | | | | |
| Warp | | 38 | | | | 38 | 38 | |
| Filling | | 50 | | | | 42 | 49 | |
| Bursting Strength Mullen Points: | | | | | | | | |
| Original | 58 | 84 | 76 | 82 | | 56 | 65 | 65 |
| After 5 Hand Washes | 68 | 73 | 70 | 73 | | 68 | 67 | |
| Percent Ignition Loss: | | | | | | | | |
| Original | 2.01 | 1.94 | 1.29 | 1.09 | 1.92 | 1.85 | 1.56 | 2.19 |
| After 5 Hand Washes | 1.58 | 1.58 | 1.20 | 1.05 | | 1.89 | 1.59 | |
| Slippage (lbs.): | | | | | | | | |
| Yarns 1 to 2: | | | | | | | | |
| Original | 0.92 | 0.72 | 1.04 | 1.23 | | 1.41 | 0.61 | 1.07 |
| After 5 Hand Washes | 0.30 | 1.27 | | | | 0.37 | 0.17 | 0.25 |
| Yarns 1, 2 to 3: | | | | | | | | |
| Original | 1.61 | 1.34 | 1.78 | 1.99 | | 2.95 | 1.26 | 1.62 |
| After 5 Hand Washes | 0.62 | 1.67 | | | | 0.75 | 0.34 | 0.42 |
| Yarns 1, 2, 3 to 4: | | | | | | | | |
| Original | 2.24 | 1.94 | 2.42 | 2.70 | | 4.01 | 1.81 | 2.45 |
| After 5 Hand Washes | 0.82 | 1.10 | | | | 1.22 | 0.49 | 0.51 |

[1] 2 amino-2 methyl-1-propanol (amount equals 2.5% by weight of methylated melamine aldehyde).

TABLE I-B

| | Runs | | | |
|---|---|---|---|---|
| | 7 | 8 | 9 | 10 |
| Composition: | | | | |
| Polyvinyl Alcohol (Elvanol 71-39) | 2.0 | 2.0 | 2.5 | 3.0 |
| Methylated Melamine Aldehyde Resin | 12.5 | 12.5 | 18.0 | 24.0 |
| Organic Amine Hydrochloride Catalyst [1] | 0.31 | 0.31 | 0.45 | 0.60 |
| Colloidal Silica, 15% Solids Aqueous Dispersion (SYTON DS) | 2.5 | 2.5 | 2.5 | 2.5 |
| Water | 82.7 | 82.7 | 76.6 | 69.9 |
| Weight Ratio of Methylated Melamine Aldehyde Resin to Polyvinyl Alcohol | 6.2 | 6.2 | 7.2 | 8.0 |
| Physical Properties: | | | | |
| Abrasion Resistance, Hours | 23.5 | 22.5 | 24.5 | 22.5 |
| Static Fold and Strength Retention: | | | | |
| Warp | 71 | 80 | 62 | 68 |
| Filling | 46 | 43 | 53 | 59 |
| Tensile Strength: | | | | |
| Warp | 38 | | 37 | |
| Filling | 41 | | 47 | |
| Bursting Strength Mullen Points: | | | | |
| Original | 54 | 67 | 69 | 65 |
| After 5 Hand Washes | 65 | 73 | 61 | |
| Percent Ignition Loss: | | | | |
| Original | 1.25 | 1.31 | 2.12 | 2.19 |
| After 5 Hand Washes | 1.27 | 1.43 | 1.81 | |
| Slippage (lbs.): | | | | |
| Yarns 1 to 2: | | | | |
| Original | 1.15 | .76 | 0.65 | 1.07 |
| After 5 Hand Washes | 0.22 | 0.25 | 0.14 | 0.25 |
| Yarns 1, 2 to 3: | | | | |
| Original | 2.43 | 1.37 | 1.33 | 1.62 |
| After 5 Hand Washes | 0.47 | 0.37 | 0.29 | 0.42 |
| Yarns 1, 2, 3 to 4: | | | | |
| Original | 0.75 | 1.91 | 1.84 | 2.45 |
| After 5 Hand Washes | 3.47 | 0.55 | 0.44 | 0.51 |

[1] 2 amino-2 methyl-1-propanol (amount equals 2.5% by weight of methylated melamine aldehyde).

Although the present invention has been described in its preferred embodiments with respect to a coating composition and method for glass fiber fabrics, it will be readily evident that in accordance with the teachings herein, individual or groups of glass filaments, strands and fibers may likewise be coated for improved results prior to fabric formation.

Furthermore, while certain preferred embodiments of this invention have been disclosed, it is not intended that the scope of the invention be limited to such embodiments nor limited in any manner otherwise than may be necessitated by the scope of the appended claims, since it is understood that from the disclosure herein various modifications of formulation, procedure and mode will be quite apparent to those skilled in the art without departing from the spirit and scope of this invention.

We claim:

1. The method of coating a fabric consisting of woven glass fibers to improve the abrasion resistance of the fabric; said method comprising the steps of: applying to the woven glass fiber fabric a composition including (a) polyvinyl alcohol, (b) an alkylated resin selected from the group consisting of alkylated urea aldehyde resins and alkylated melamine aldehyde resins, (c) a catalyst for said resin, (d) colloidal silica and (e) water; said composition being an aqueous solution excepting for the colloidal silica dispersed therein; said resin and polyvinyl alcohol being respectively present in a ratio of from 3.5:1.0 to 8.0:1.0 and said colloidal silica constituting about 2.5% by weight of the alkylated resin; drying the coating; applying a second coating of a dilute solution of a Werner-type complex compound having an acido group of at least 10 carbon atoms; and drying the second coating to drive off the diluent and insolubilize the Werner-type complex compound on the coated fibers of the fabric.

2. The method as defined in claim 1, wherein said first mentioned coating comprises about 1 to 4% polyvinyl alcohol, 2.5 to 24.0% methylated melamine aldehyde resin, an organic amine hydrochloride ranging from 2.0% to 2.5% of the methylated melamine aldehyde resin, about 2.5% of an aqueous 15% colloidal silica dispersion and the balance consisting essentially of water.

3. The method as claimed in claim 1, wherein said resin is a methylated methylol melamine resin.

4. In the method of coating a textile fabric composed of sized glass fibers to improve the abrasion resistance thereof comprising the steps of heating said textile fabric at a temperature sufficiently elevated to burn the size from said fibers; the improvement which includes applying an aqueous mixture coating to the glass fibers; said aqueous mixture consisting essentially of 1.0 to 4.0% polyvinyl alcohol, 2.5 to 24.0% alkylated melamine aldehyde resin, 2.0 to 2.5% of a catalyst for said resin, about 2.5% of an aqueous colloidal silica and water; said composition being essentially an aqueous solution excepting for the colloidal silica dispersed therein; drying said coating at a temperature of from about 200 to 275 degrees F.; applying an additional coating of a 1.0% to 2.0% concentrated solution of a Werner-type complex compound having an acido group of at least 10 carbon atoms; and drying said additional coating to evaporate the diluent and insolubilize the Werner-type complex compound on the coated fibers of the fabric.

5. A coated fabric formed of glass fibers; and fabric bearing an abrasion resistant coating consisting essentially of the heat-cured reaction of an aqueous solution including polyvinyl alcohol, an alkylated resin selected from the group consisting of alkylated urea aldehyde resins and alkylated melamine aldehyde resins and a catalyst for the resin; said resin and polyvinyl alcohol being respectively present in a ratio of from 3.5:1.0 to 8.0:1.0; said coating including a minor proportion of dispersed colloidal silica, and an overlayer on said coating including a Werner-type complex compound having an acido group of at least 10 carbon atoms forming a fixing agent for said coating; said coated fabric being significantly resistant to abrasion.

6. An abrasion resistant glass fabric as claimed in claim 5, wherein said resin is a methylated methylol melamine resin.

7. A textile fabric of glass fibers as defined in claim 5, wherein said coating comprises the heat-cured reaction product of about 1% to 4% polyvinyl alcohol, 2.5% to 24.0% alkylated methylol melamine aldehyde resin, a catalyst for said resin ranging from 2.0% to 2.5% of the alkylated methylol melamine aldehyde resin, about 0.375% colloidal silica, and the balance consisting essentially of water.

8. The method as claimed in claim 1, wherein the composition additionally includes an acyl guanidine, said guanidine being sufficient to constitute from about 5 to about 20 percent by weight of the said alkylated resin.

9. A coated glass fiber textile fabric as claimed in claim 5, wherein the composition forming the first layer of said coating includes an acyl guanidine, said guanidine being sufficient to constitute from about 5 to about 20 percent by weight of the said aminoplast.

References Cited

UNITED STATES PATENTS

| | | | |
|---|---|---|---|
| 2,527,329 | 10/1950 | Powers et al. | 260—395 |
| 2,650,184 | 8/1953 | Biefeld | 117—126 |
| 2,951,772 | 9/1960 | Marzocchi et al. | 117—126 |
| 2,955,053 | 10/1960 | Roth | 117—126 |
| 2,992,124 | 7/1961 | Campbell | 117—126 |
| 3,008,846 | 11/1961 | Caroselli | 117—126 |

OTHER REFERENCES

Elvanol, Vinyl Products Div. E. I. du Pont de Nemours and Co., Inc., Wilmington, Del., pp. 33, 34 and 42.

ALFRED L. LEAVITT, *Primary Examiner.*

J. H. NEWSOME, *Assistant Examiner.*